United States Patent [19]

Pawlowski et al.

[11] Patent Number: 5,163,090
[45] Date of Patent: Nov. 10, 1992

[54] OVER-CURRENT VERIFIER CIRCUIT FOR AN ENHANCED SUBSCRIBER LINE INTERFACE

[75] Inventors: Chris Pawlowski; Michael Warner, both of Phoenix, Ariz.

[73] Assignee: AG Communication Systems Corporation, Phoenix, Ariz.

[21] Appl. No.: 599,536

[22] Filed: Oct. 18, 1990

[51] Int. Cl.$^5$ ...................... H04M 19/00; H04M 3/02
[52] U.S. Cl. .................................... 379/399; 379/412; 379/377; 379/379
[58] Field of Search ............... 379/399, 412, 377, 413, 379/379, 400, 398

[56] References Cited

U.S. PATENT DOCUMENTS

| | | | |
|---|---|---|---|
| 4,254,305 | 3/1981 | Treiber | 379/398 X |
| 4,524,246 | 6/1985 | Meza | 379/377 |
| 4,551,670 | 11/1985 | Anders et al. | 379/413 X |
| 4,598,173 | 7/1986 | Chea, Jr. et al. | 379/413 X |
| 4,623,760 | 11/1986 | Binkerd et al. | 379/377 X |
| 4,897,872 | 1/1990 | Siligoni et al. | 379/412 |

*Primary Examiner*—James L. Dwyer
*Assistant Examiner*—M. Shehata
*Attorney, Agent, or Firm*—Gregory G. Hendricks

[57] ABSTRACT

An over-current verifier circuit used in a Subscriber Line Interface Circuit (SLIC) for validating an over-current condition on a subscriber loop comprising a first counter connected to the SLIC disposed to receive an oversense signal from the SLIC. The first counter begins counting when the oversense signal is received and produces an output signal when the oversense signal is still active after the counter finishes, denoting a dc over-current in the subscriber loop. A timer circuit connected to the SLIC also receives the oversense signal. The timer is arranged to begin counting when the oversense signal is received. A second counter further receives the oversense signal and is advanced by one count on the high to low transition of the oversense signal. The second counter produces an output signal when three counter advances are produced before the timer times out, denoting an ac over-current condition. A register circuit connected to the first counter and to the second counter is arranged to receive the first counter output signal or the second counter output signal and transmit to a logic interface an over-current signal advising a central controller that an over-current condition exists on the subscriber loop. Finally, a cut clear pulse generator connected to the register circuit and to a cut relay is also arranged to receive the over-current signal from the register circuit and produce an output pulse that enables the cut relay. The cut relay then electrically breaks the subscriber loop, isolating the SLIC from the subscriber loop.

12 Claims, 4 Drawing Sheets

OVER-CURRENT VERIFIER CIRCUIT FOR AN ENHANCED SUBSCRIBER LINE INTERFACE

CROSS-REFERENCE TO RELATED APPLICATIONS

Cross reference is made to the following related Application entitled: "An Enhanced Subscriber Line Interface Circuit", (Ser. No. 07/599,535); "An Enhanced High Voltage Line Interface Circuit", (Ser. No. 07/599,537); "A Hybrid Balance And Combination Codec Filter Circuit", (Ser. No. 07/599,533); and "A Ringing Signal Control Circuit For An Enhanced Subscriber Line Interface", (Ser. No. 07/599,534), filed on the same data as the instant Application, and having a common assignee.

BACKGROUND OF THE INVENTION

1. Field of the Invention

The present invention relates in general to the field of telecommunications, and more particularly, to an over-current verifier circuit used in an enhanced Subscriber Line Interface Circuit (SLIC).

2. Description of the Prior Art

Subscriber line interface circuits are customarily found in the central office exchange of a telecommunications network. The SLIC weds the digital switching network of the central office exchange to a plurality of analog subscriber lines. The analog subscriber lines connect to subscriber stations or telephone instruments found at subscriber locations remote from the central office exchange.

The SLIC functions to supply power to a subscriber station and to transmit and receive voice signals between the digital switching network and the subscriber station.

Modern solid state SLICs are constructed using specialized integrated circuits. This construction dispenses with the need for inductive components in the analog end of the interface. The operating environment of the SLIC includes a necessity to provide high voltages and currents, used for analog voice transmission and substation signaling, as well as, low voltage digital logic signals used for the transmission of digital data between the SLIC and the digital switching network. The high voltage requirements of −48V battery feed is accomplished using a specialized High Voltage Subscriber Line Interrace Circuit (HVSLIC). Such as the HVSLIC circuit described in patent application Ser. No. 445,516, filed Dec. 4, 1989, entitled "High Voltage Subscriber Line Interface Circuit", having a common assignee with the present invention.

The translation of the analog voice signals to PCM encoded digital signals and the interface of the PCM digital signals between the line circuit and the digital switching system is accomplished using a specialized integrated circuit known as a CODEC/FILTER. The CODEC/FILTER converts analog voice signals received from a subscriber line and the HVSLIC to PCM encoded digital signals. Similarly, PCM encoded digital signals from the digital switching system are converted into analog voice signals for transmission on the subscriber line. One such device is the commercially available as the CODEC/FILTER COMBO~, TP30XX family of COMBO~ devices manufactured by the National Semiconductor Company.

The SLIC must also provide certain signaling and detection functions in order to allow the digital switching system to communicate with a subscriber station. These signaling and detection functions include ringing signal control, ring-trip and loop sense detection as well as detection of abnormal loop conditions.

These functions are normally provided by a low voltage companion circuit of the HVSLIC usually referred to as a Low Voltage Subscriber Line Interface Circuit (LVSLIC). One such LVSLIC circuit is described in U.S. patent application Ser. No. 445,826, filed Dec. 4, 1989, entitled "Control Circuit For A Solid State Telephone Line Circuit", having a common assignee with the present invention. The LVSLIC communicates via a data and address bus with a central controller of the digital switching system. Information pertaining to the status of the SLIC and the subscriber line are transmitted from the LVSLIC to the central controller. Operating commands from the central controller are received by the LVSLIC for execution by the SLIC.

One of the functions provided by a LVSLIC is over-current sense. Over-current sensing is performed to determine whether an excessive voltage appears on the subscriber loop. Large voltages directly applied or induced into a subscriber loop can cause catastrophic damage to the sensitive circuits of the SLIC. The over-current verifier circuit monitors the subscriber line and is disposed to isolate the SLIC circuit from the subscriber loop when a threshold voltage is exceeded.

However, the over-current sense circuit must be able to discriminate between a legitimate prolonged over-current condition, and a fast erroneous voltage pulse that may be induced on the loop. An over-current verifier circuit should be designed to keep noise pulses from being reported to the central office controller as an abnormal loop condition.

Presently available SLICs conform to a circuit architecture that connects in combination an integrated circuit HVSLIC, an LVSLIC, and CODEC/FILTER with discrete components that provide subscriber line configuration and protection. This SLIC combination connects a single subscriber line to the central office exchange.

Such a SLIC is described in U.S. patent application Ser. No. 445,517, filed Dec. 4, 1989, entitled "A Solid State Telephone Line Circuit", having a common assignee with the present invention.

The SLIC just described is normally one circuit of a plurality of SLICs that are assembled on a line card. The line card connects a plurality of subscriber lines to the digital switching network. Typically, eight or more SLICs can be found on a single line card. However, each SLIC is susceptible to catastrophic damage due to the environment of the associated subscriber line, such as lightning strikes, power surges, etc. A failure of one SLIC circuit necessitates the replacement of the line card. It is advantageous therefore to be able to replace only those circuits of the line card that are damaged by the aforementioned environmental factors and not the entire line card.

Further, since the LVSLIC acts primarily as a local controller and signal detector between the central controller of the digital switching system and the HVSLIC and COMBO, a certain amount of economy in circuit components can be realized by removing the LVSLIC from the above mentioned combination. By placing the LVSLIC in a more central location the LVSLIC can provide control and detection functions to two or more HVSLIC and COMBO circuits. The central location also isolates the digital control from the high voltage associated with the HVSLIC.

Accordingly, it is an object of the present invention to provide a new and effective over-current verifier circuit for an enhanced subscriber line interface.

SUMMARY OF THE INVENTION

The above and other objects, advantages, and capabilities are realized in an over-current verifier circuit used in a Subscriber Line Interface Circuit (SLIC) for validating an over-current condition on a subscriber loop. The SLIC is connected to the subscriber loop via a cut relay and includes a sense circuit for sensing the magnitude of electrical current flowing in the subscriber loop. The sense circuit is arranged to produce an oversense signal when a threshold limit is exceeded. The SLIC further includes a logic interface for transmitting data representing the status of the SLIC to a central controller. The over-current verifier circuit of the present invention includes a first counter connected to the SLIC disposed to receive the oversense signal. The first counter is arranged to begin counting when the oversense signal is received and produces an output signal responsive to the oversense signal continuing for a period that is greater than 56 milliseconds. Indicative of a dc over-current on the subscriber loop.

A timer circuit connected to the SLIC also receives the oversense signal. The timer is arranged to begin counting when the oversense signal is received.

A second counter connected to the SLIC receives the oversense signal and is arranged to advance by one count on the high to low transition of the oversense signal. The second counter produces an output signal when three counter advances are produced before the timer means reaches a 56 millisecond period. Indicative of an ac over-current condition on the subscriber loop.

A register circuit is connected to the first counter and to the second counter. The register circuit is arranged to receive the first counter output signal, and transmit to the logic interface an over-current signal advising the central controller that an over-current condition exists on the subscriber loop. Alternatively, the register circuit is arranged to receive the second counter output signal producing a similar over-current signal that is transmitted to the logic interface advising the central controller that an over-current condition exists on the subscriber loop.

Finally, a cut clear pulse generator is connected to the register circuit and to the cut relay. The cut clear pulse generator is arranged to receive the over-current signal from the register circuit and produce an output pulse that enables the cut relay. The cut relay then electrically breaks the subscriber loop, isolating the SLIC from the subscriber loop.

BRIEF DESCRIPTION OF THE DRAWINGS

A better understanding of the invention may be had from the consideration of the following detailed description taken in conjunction with the accompanying drawings in which.

DESCRIPTION OF A PREFERRED EMBODIMENT

Figure 1:
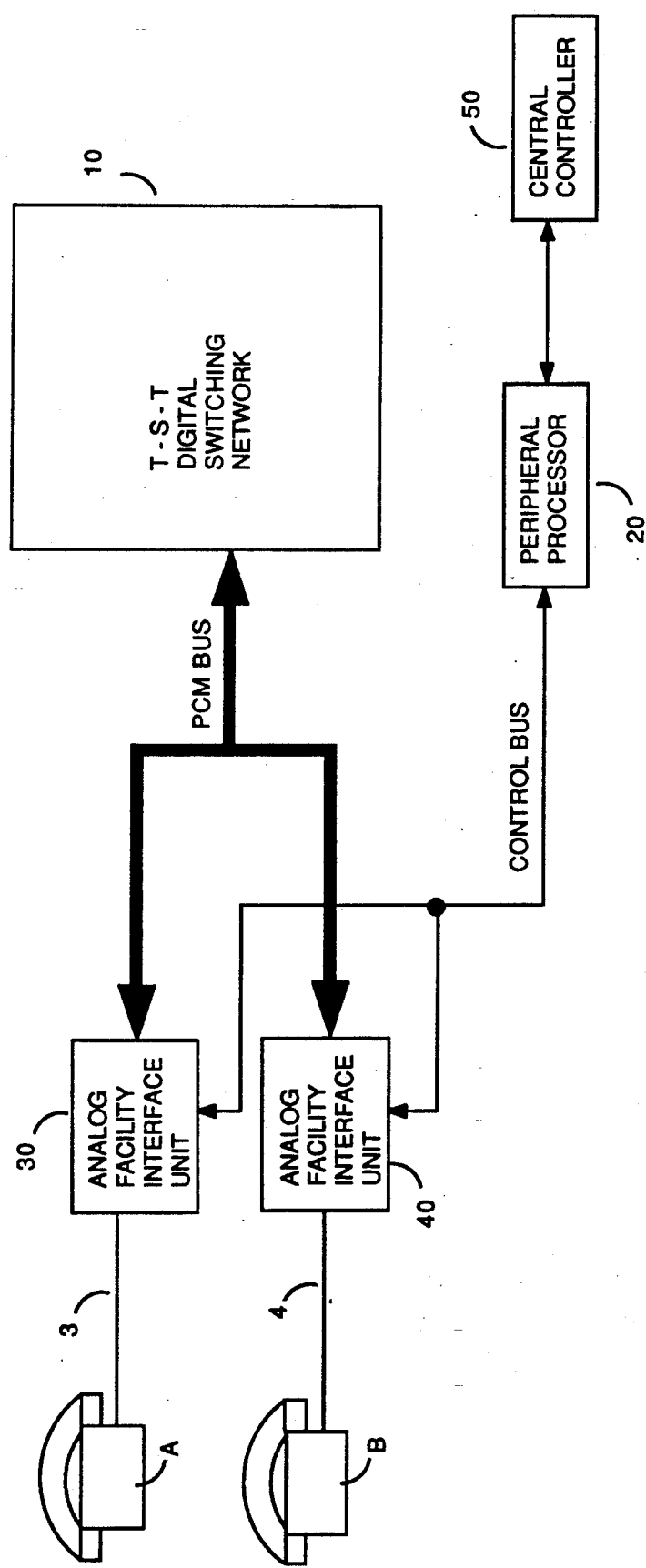
FIG. 1 is a simplified block diagram of a T-S-T central office switching system where the enhanced SLIC in accordance with the present invention is used to advantage.

Turning now to FIG. 1 of the included drawings a central office switching system or central office exchange of the type to which the invention is used to advantage is illustrated. The central office switching system includes a time division multiplexed Time-Space-Time (T-S-T) digital switching network 10 consisting minimally of an originating time switch and control unit, a space switch unit and a terminating time and control unit (not shown). The T-S-T network 10, connects to Analog Facility Interface Units (AFIU) 30 and 40 via a (Pulse Code Modulation) PCM BUS. Each AFIU 30 and 40 allows, in this embodiment, the connection of subscriber lines 3 and 4 respectively to the network 10. Subscriber lines 3 and 4 further connect to subscriber telephone instruments A and B, respectively. The network 10 and each AFIU 30 and 40 is further connected to a Peripheral Processor (PP) 20, via a CONTROL BUS. The PP 20 maintains control of its environment by scanning the AFIUs 30 and 40 and controlling the associated network time and control units. The total control of the network connections within the network 10 is the responsibility of the Central Controller (CC) 50. That is, the central controller 50, via the PP 20, informs the time and control units of the time switch connections and also informs the space switch unit of the space switch connections. In addition the CC 50 maintains a data base of the call processing and administrative software for the central office switching system.

Analog voice signals from the transmitter of subscriber instrument A are transmitted to AFIU 30 where they are converted to PCM encoded digital signals. The PCM encoded digital signals are then inserted into available channels on the PCM BUS and transmitted to the digital switching network 10. Under control of the PP 20 the PCM encoded digital signals from subscriber A are switched through the digital switching network 10 and transmitted to AFIU 40 on the PCM BUS. The received PCM encoded digital signals are converted back to analog voice signals and transmitted via subscriber line 4 to the receiver of subscriber instrument B. The SLIC of the present invention is located within the AFIU.

Figure 2:
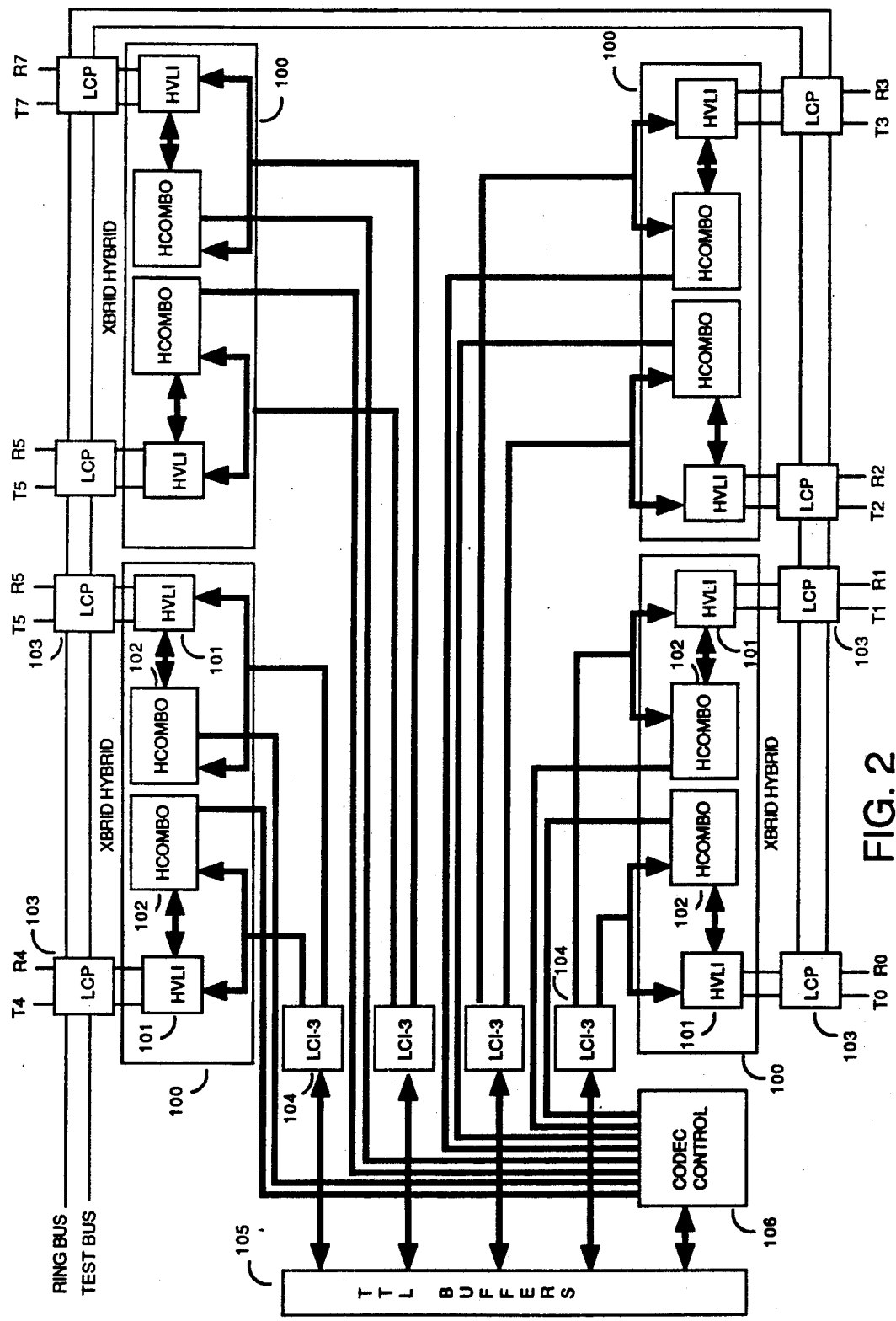
FIG. 2 is a block diagram of a line card including the enhanced SLIC in accordance with the present invention.

Turning now to FIG. 2 of the included drawings a block diagram of a line card including the enhanced SLIC is shown. The line card shown in FIG. 2 includes eight SLICs. Each SLIC is arranged to interface a single subscriber line comprised of a Tip (T) lead and Ring (R) lead to the T-S-T digital switching network 10. The line card includes four thick-film transmission hybrid (XBRID) modules 100. All critical analog components of the SLIC are contained on the XBRID module 100. Each XBRID module 100 further includes two High Voltage Line Interface (HVLI) circuits such as HVLI 101 and two Hybrid Combo (HCOMBO) circuits such as HCOMBO 102 along with matched resistor networks and battery feed transistors (not shown). An HVLI 101 and a HCOMBO 102 form one functional SLIC that in combination provide most of the so-called BORSCHT-functions. In particular, the function of the subscriber power supply (Battery), line status monitoring (Signals, Supervision), analog-digital conversion (Coding) and filter functions and two wire-four wire transition (Hybrid) are provide by the HVLI 101 and HCOMBO 102 of each XBRID module 100.

In addition to powering the subscriber line, the HVLI 101 performs the essential two wire-four wire hybrid function of splitting the balanced signal on the T and R leads to separate transmit/receive paths. The differential audio signals are transmitted and received to/from the HCOMBO 102. The HVLI 101 further performs loop supervision, ring trip detection, ground sensing and over-current detection. A more detailed explanation of the electrical structure and operation of HVLI 101 may be had by reference to co-pending U.S. patent application Ser. No. 07/599,537.

The HCOMBO 102 synthesizes the input impedance of the SLIC and performs hybrid balance echo cancellation. Additionally, the HCOMBO 102 converts the differential audio signals from the HVLI 101 to PCM encoded digital signals and from PCM encoded digital signals to differential audio signals. A more detailed explanation of the electrical structure and operation of HCOMBO 102 may be had by reference, to co-pending U.S. patent application Ser. No. 07/599,533.

The remainder of the BORSCHT functions are provided by the Line Configuration and Protection (LCP) circuit 103, located off the XBRID module 100. The LCP 103 appears between the T and R leads of a subscriber line and the HVLI 101. The LCP 103 functions to provide overvoltage protection (Overvoltage), the application of ringing current to the subscriber line (Ringing) and testing of the subscriber line as well as the SLIC (Test). The LCP 103 contains ring relays which under software control inject ringing current from a ringing generator (not shown) to the subscriber line. Similarly the subscriber line as well as the SLIC can be isolated and tested via a test relay (not shown) that provides facility test (Out Test) and circuit test (In Test). The test relay allows the application of test signals from a test program which resides in the CC 50. The LCP 103 further includes a cut relay (not shown) which isolates the SLIC from the subscriber line when an over-current condition is detected.

In a digital common logic area of the line card resides a plurality of Line Control Interface (LCI) circuits 104. Each LCI 104 performs all of the control and sense logic functions for the two SLICs of an associated XBRID module 100. In particular, each LCI 104 functions to administer and control the ringing and test relays, hook status reporting, dial pulse detection, ring trip, ground sensing, and over-current detection. Each LCI 104 connects its associated XBRID module 100 to PP 20 via a control and sense bus.

Digital logic buffers 105 transmit data from the HCOMBO 101 of XBRID module 100, to the PCM bus of the network, and conversely, receive PCM data from the network PCM bus to a respective HCOMBO 102. CODEC Control circuit 106 is an octal Time Slot Assigner Circuit (TSAC) device that functions to generate transmit and receive frame sync pulses to its connected HCOMBO devices 102. One TSAC 106 connects to all eight HCOMBOs of the line card. The network provides a required 1.544 MHz clock with a nominal 50% duty cycle for the purpose of shifting PCM data in and out of the HCOMBO 102 data registers. A frame (125 $\mu$sec) provides for 24 eight bit PCM channels with one framing bit for synchronization. One such TSAC device is the TP3155 Time Slot Assigner Circuit manufactured by the National Semiconductor Corporation.

As can be seen in FIG. 2, the four XBRID modules 100 on the line card, include eight SLIC circuits that via each SLICs associated LCP 103 connect to eight subscriber lines. Further, each of the four LCI 104 circuits is connected via a control and sense bus to an associated XBRID module 100 and the HVLI 101 and HCOMBO 102 pair. Still further, a single CODEC controller 106 connects via a PCM and CODEC data bus, to all eight HCOMBO devices 102 via a PCM and CODEC data bus, allowing the CODEC controller 106 to control the PCM time slot allocation for each of the eight SLICs. Finally, the PCM data and control and sense data is transmitted to the digital switching network 10 via the TTL buffers 105 and the network bus.

The LCI circuit 104 provides an over-current sense point to indicate to software when an excessive voltage appears on the subscriber line. There are two stages of over-current sense implementation which LCI 104 will support. First, the over-current would be read by software but the CUT relay would not be implemented in hardware. In the second, the cut relay would be activated. An over-current condition is sensed by HVLI 101 and communicated to LCI 104 by developing an active low signal OVERSENSE.

Figure 3:
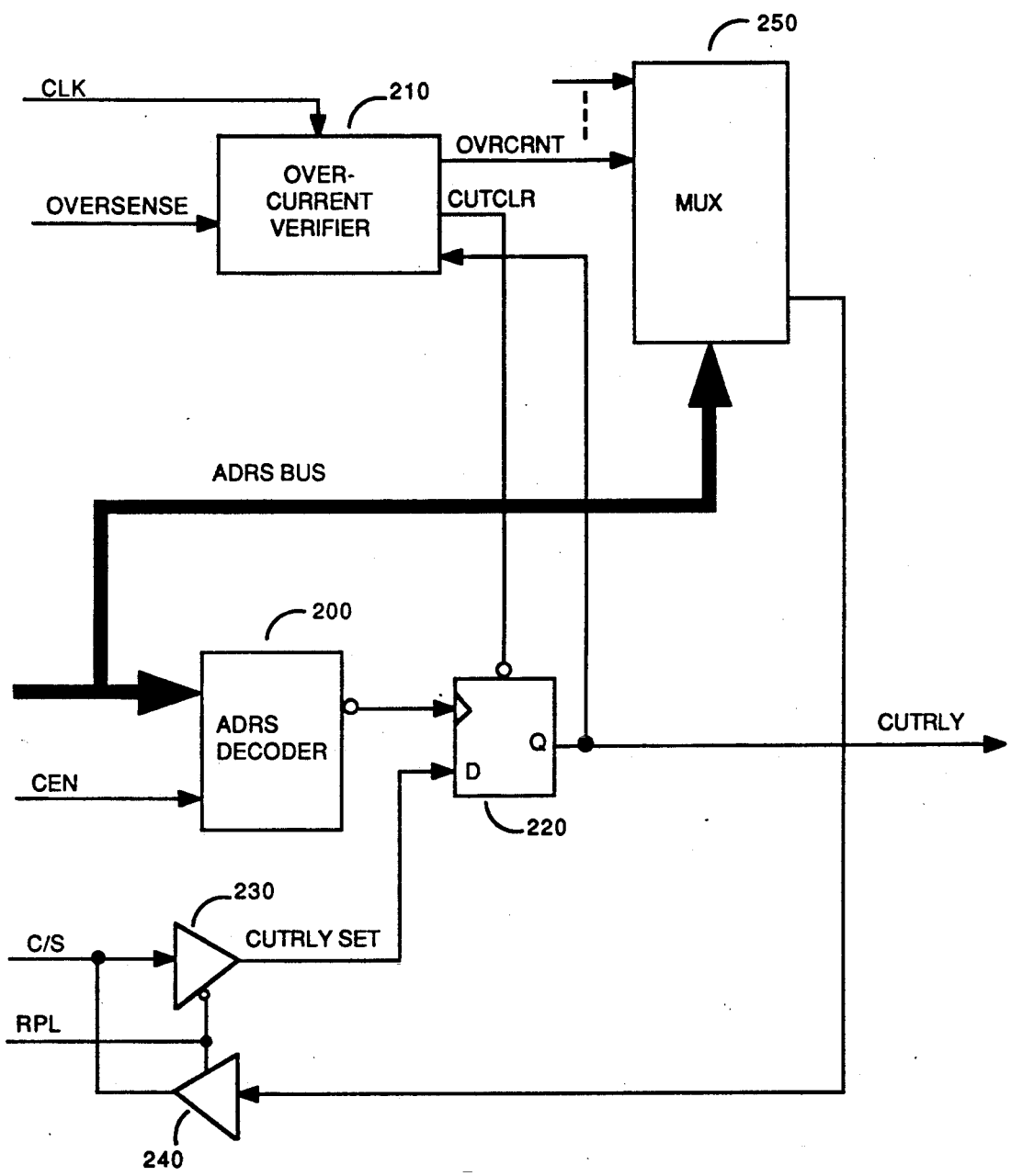
FIG. 3 is a block diagram of one of the two over-current sense circuits residing in the line control interface of the enhanced SLIC in accordance with the present invention.

Turning now to FIG. 3, of the included drawings, one copy of the two over-current circuits found within LCI 104 is shown. LCI 104 is essentially memory mapped hardware for the time switch of the T-S-T digital switching network 10. It receives asynchronous peripheral processor accesses under software control. Control and sense information is passed to and from the LCI 104 on a two bit (one bit per line circuit) parallel bidirectional bus. The data lead which conveys control and sense data to the over-current circuit of the present invention is shown in FIG. 3 as C/S.

The over-current circuit includes an address decoder 200 and a multiplexer 250, that are connected to a four bit address bus. The type of access information, that is, data that controls the LCI 104 and sense data that the peripheral processor reads from the LCI 104, is determined by the four bit address and the card enable signal CEN. For example, an address of 0011 would address the multiplexer 250 to allow the peripheral processor to read or sense if an over-current condition exists. An address of 1011 with signal CEN enabled would enable address decoder 200 and prepare cut register 220 for the input of data from the C/S data lead. Since the C/S data lead is bidirectional, signal RPL applied to transceivers 230 and 240 controls the direction of the information traveling on the C/S data lead. Thereby, allowing the reading of signal OVRCRNT from the multiplexer 250 (sense data) or the input of a control data bit (control data) to the cut register 220. The over-current circuit further includes an over-current detector circuit 210 connected to HVLI 101. Signal OVERSENSE is developed in HVLI 101 when an over-current condition is sensed on the subscriber loop. OVERSENSE is then coupled into detector 210 where it is tested to ascertain if the over-current condition is valid. The circuit tests for both dc and ac over-current conditions and if a valid condition exists, produces signal OVRCRNT. Signal OVRCRNT is coupled to multiplexer 250 for transmission to the peripheral processor.

Simultaneously, signal OVRCRNT is also coupled into cut register 220. Signal OVRCRNT clears cut register 220, deactivating a cut relay (not shown) which is arranged to break the tip and ring leads of the subscriber loop. This immediately removes the over-current condition and prevents damage to HVLI 101. Once the over-current sense point is set, it will remain set until software writes a control bit to the cut register 220, reactivating the cut relay.

Figure 4:
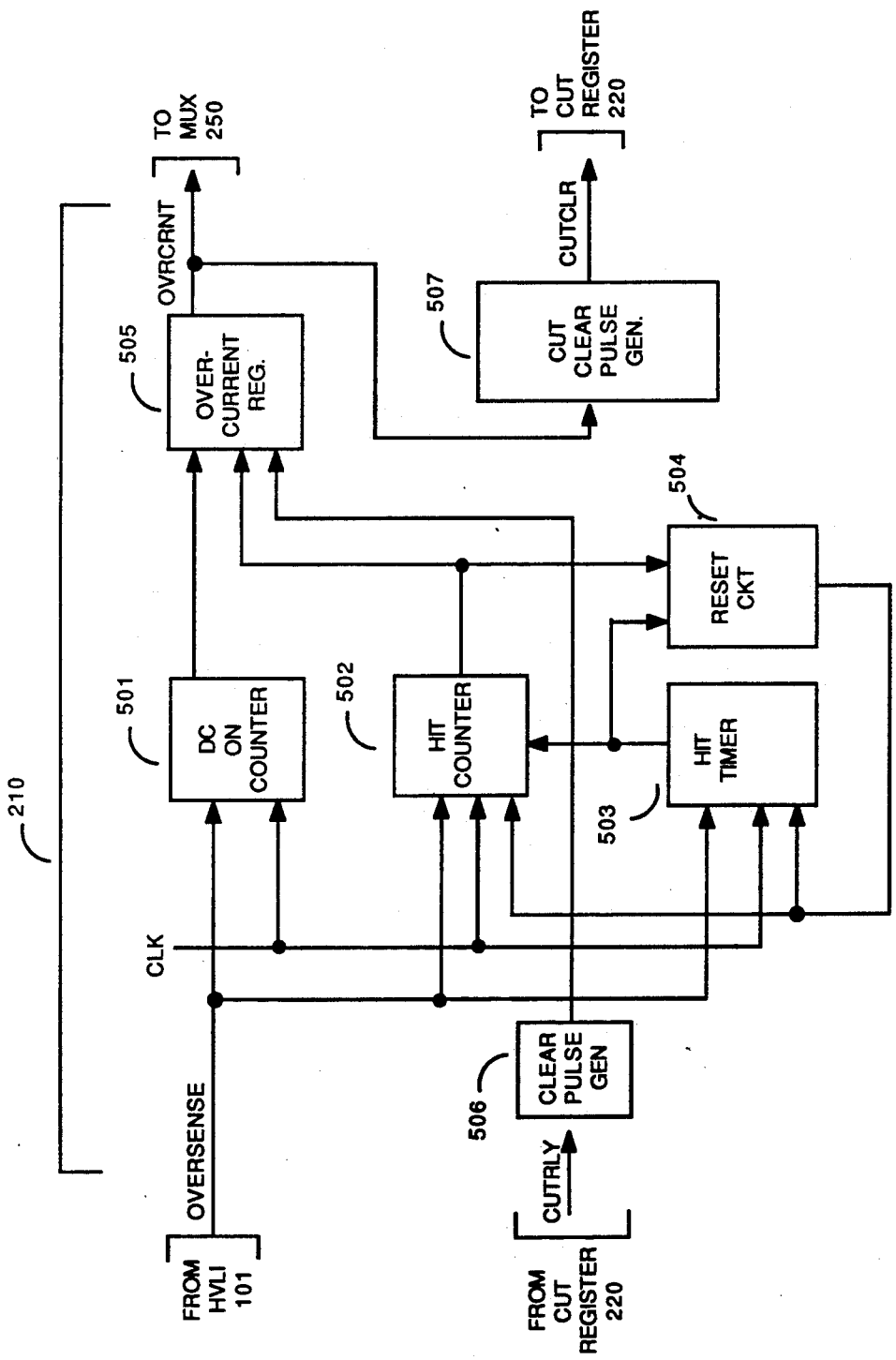
FIG. 4 is a block diagram of the over-current verifier circuit in accordance with the present invention.

Turning now to FIG. 4 of the included drawings the over-current verifier circuit of the present invention will be explained. The over-current verifier 210 is connected to HVLI 101 via the OVERSENSE signal lead. OVERSENSE is connected to a dc on counter 501, a hit counter 502 and a hit timer 503. Counters 501, 502 and timer 503 are used to determine the validity of the OVERSENSE signal received from HVLI 101. The dc on counter 501 and the hit counter 502 are connected to over-current register 505 where valid over-current signals are latched. Once set, circuit 505 produces output signal OVRCRNT. Signal OVRCRNT is then transmitted to multiplexer 250 and cut clear pulse generator 507. Cut clear pulse generator 507 produces a CUTCLR pulse when a valid over-current condition is sensed. This clear pulse is applied to cut register 220. Clear pulse generator 506 is arranged to clear over-current register 505 when cut register 220 is set by software.

With renewed reference to FIG. 4 an explanation of the manner in which the present invention operates will now be given. The circuit of the present invention can detect both dc and ac over-current conditions. For a dc over-current, dc on counter 501 is held clear as long as there is no over-current indicated from HVLI 101. A low logic input on OVERSENSE removes the clear and enables dc on counter 501 to begin counting. Counter 501 is clocked with a 250 Hz clock signal from the CLK input. If OVERSENSE remains low for 15 counts (56 milliseconds), then the over-current register 505 is set, producing signal OVRCRNT. Additionally, OVRCRNT is applied to cut clear pulse generator 507 where a pulse CUTCLR is generated and transmitted to cut clear register 220. The CUTCLR pulse clears register 220 and opens the subscriber loop via a cut relay (not shown). Once the over-current register 505 is set it will remain set until software writes a positive logic data bit into cut register 220. The transition of signal CUTRLY from a low logic level to a high logic level signal causes the clear pulse generator 506 to produce a clear pulse to the over-current register 505, thereby, clearing register 505.

The detection of an ac over-current condition works in a similar fashion. A low logic signal at OVERSENSE enables the hit timer 503 to begin counting. A high to low transition of the OVERSENSE input also causes the hit counter 502 to register one hit. Each subsequent low pulse on OVERSENSE will cause the hit counter 502 to advance. If three hits are registered before the hit timer 503 reaches a count of 15 (56 milliseconds minimum), then it is considered a valid ac over-current and the over-current register 505 is set. However, if the hit timer 503 reaches a count of 15 before the hit counter 502 reaches a count of three, then the hit counter and hit timer are reset by the reset circuit 504 and the next pulse on OVERSENSE will restart the ac detection sequence. The interaction between the over-current register 505 and the cut register 220 remains the same whether it is a dc or an ac over-current condition.

As can be appreciated from the above description the over-current verifier circuit of the present invention effectively discriminates between a legitimate prolonged over-current condition, and a fast erroneous voltage pulse that may be induced on the loop. Large voltages directly applied or induced into a subscriber loop can cause catastrophic damage to the sensitive circuits of the SLIC. The over-current verifier circuit monitors the subscriber line and is disposed to isolate the HVLI 101 from the subscriber loop when a over-current condition is detected.

Furthermore, it will be obvious to those skilled in the art that numerous modifications to the present invention can be made without departing from the scope of the invention as defined by the appended claims. In this context, it should be recognized that the essence of the present invention resides in a new and effective over-current verifier circuit for an enhanced subscriber line interface.

What is claimed is:

1. An over-current verifier used in a Subscriber Line Interface Circuit (SLIC) for validating a direct current over-current condition on a subscriber loop, said SLIC connected to said subscriber loop via subscriber loop breaking means, and said SLIC including means for sensing the magnitude of electrical current flowing in said loop arranged to produce an oversense signal when a threshold limit is exceeded, and logic means for transmitting data representing the status of said SLIC to a central controller, said over-current verifier comprising:

a direct current on counter connected to said SLIC disposed to receive said oversense signal, said direct current on counter arranged to begin counting when said oversense signal is received producing an output signal when said oversense signal remains after a specific count is reached;

an over-current register connected to said direct current on counter for receiving said direct current on counter output signal and further arranged to transmit to said logic means an over-current signal advising said central controller that an over-current condition exists on said subscriber loop; and a cut clear pulse generator connected to said over-current register arranged to receive said over-current signal from said over-current register, said cut clear pulse generator in response to said over-current signal produces an output pulse that enables said subscriber loop breaking means, electrically breaking and isolating said SLIC from said subscriber loop.

2. The over-current verifier as claimed in claim 1 wherein, said logic means is connected to said subscriber loop breaking means and said logic means is further arranged to receive a set signal from said central controller disabling said subscriber loop breaking means and electrically connecting said SLIC to said subscriber loop and said over-current register further includes a clear pulse generator connected to said subscriber loop breaking means and said over-current register, whereby responsive to the disabling of said subscriber loop breaking means said clear pulse generator produces and outputs to said over-current generator a clear pulse clearing said over-current signal from said over-current register.

3. An over-current verifier used in a Subscriber Line Interface Circuit (SLIC) for validating an alternating current over-current condition on a subscriber loop, said SLIC connected to said subscriber loop via subscriber loop breaking means, and said SLIC including means for sensing the magnitude of electrical current flowing in said loop arranged to produce an oversense signal when a threshold limit is exceeded, and logic means for transmitting data representing the status of said SLIC to a central controller, said over-current verifier comprising:
- a timer circuit connected to said SLIC disposed to receive said oversense signal, said timer circuit arranged to begin counting when said oversense signal is received;
- an alternating current hit counter connected to said SLIC disposed to receive said oversense signal, said alternating current hit counter arranged to advance by one count on the high to low transition of said oversense signal, said alternating current hit counter producing an output signal when a first specific count is reached before said timer circuit reaches a second specific count;
- an over-current register connected to said alternating current hit counter for receiving said alternating current hit counter output signal and further arranged to transmit to said logic means an over-current signal advising said central controller that an over-current condition exists on said subscriber loop; and
- a cut clear pulse generator connected to said over-current register arranged to receive said over-current signal from said over-current register, said cut clear pulse generator in response to said over-current signal produces an output pulse that activates said subscriber loop breaking means, electrically breaking and isolating said SLIC from said subscriber loop.

4. The over-current verifier as claimed in claim 2 wherein, there is further provided a reset circuit connected to said alternating current hit counter and said timer circuit, said reset circuit arranged to develop a reset pulse when said hit counter reaches said second specific count before said alternating current hit counter reaches said first specific count, whereby said reset pulse is transmitted to said alternating current hit counter and said timer circuit resetting said alternating current hit counter and said timer circuit.

5. The over-current verifier as claimed in claim 3 wherein, said logic means is connected to said subscriber loop breaking means and said logic means is further arranged to receive a set signal from said central controller disabling said subscriber loop breaking means and electrically connecting said SLIC to said subscriber loop, and said over-current register further includes a clear pulse generator connected to said subscriber loop breaking means and said over-current register, whereby responsive to the disabling of said subscriber loop breaking means said clear pulse generator produces and outputs to said over-current generator a clear pulse clearing said over-current signal from said over-current register.

6. An over-current verifier used in a Subscriber Line Interface Circuit (SLIC) for validating a over-current condition on a subscriber loop, said SLIC connected to said subscriber loop via subscriber loop breaking means, and said SLIC including means for sensing the magnitude of electrical current flowing in said loop arranged to produce an oversense signal when a threshold limit is exceeded, and logic means for transmitting data representing the status of said SLIC to a central controller, said over-current verifier comprising:
- a direct current counter circuit for detecting a direct current over-current condition connected to said SLIC disposed to receive said oversense signal, said direct current on counter arranged to begin counting when said oversense signal is received producing an output signal when said oversense signal remains after a first specific count is reached;
- a timer circuit connected to said SLIC disposed to receive said oversense signal, said timer circuit arranged to begin counting when said oversense signal is received;
- an alternating current counter circuit for detecting an alternating current over-current condition connected to said SLIC and disposed to receive said oversense signal, said alternating current counter arranged to advance by one count on the high to low transition of said oversense signal, and said alternating current counter producing an output signal when a second specific count is reached before said timer circuit reaches a third specific count;
- an over-current register connected to said direct current counter circuit and to said alternating current counter circuit for receiving said direct current counter output signal when said first specific count is reached and further arranged to transmit to said logic means an over-current signal advising said central controller that an over-current condition exists on said subscriber loop and alternatively, receiving said alternating current counter signal when a second specific count is reached before said timer circuit reaches a third specific count and further arranged to transmit to said logic means an over-current signal advising said central controller that an over-current condition exists on said subscriber loop; and
- a cut clear pulse generator connected to said over-current register arranged to receive said over-current signal from said over-current register, said cut clear pulse generator in response to said over-current signal produces an output pulse that enables said subscriber loop breaking means, electrically breaking and isolating said SLIC from said subscriber loop.

7. The over-current verifier as claimed in claim 6 wherein, there is further provided a reset circuit connected to said alternating current hit counter and said timer circuit, said reset circuit arranged to develop a reset pulse when said timer circuit reaches said third specific count before said alternating current counter reaches said second specific count, whereby said reset pulse is transmitted to said alternating current counter and said timer circuit resetting said alternating current counter and said timer circuit.

8. The over-current verifier as claimed in claim 6 wherein, said logic means is connected to said subscriber loop breaking means and said logic means is further arranged to receive a set signal from said central controller disabling said subscriber loop breaking means and electrically connecting said SLIC to said subscriber loop, and said over-current register further includes a clear pulse generator connected to said subscriber loop breaking means and said over-current register, whereby responsive to the disabling of said subscriber loop breaking means said clear pulse generator produces and outputs to said over-current generator a clear pulse clearing said over-current signal from said over-current register.

9. The over-current verifier as claimed in claim 6 wherein said direct current counter circuit first specific count is 15 counter advances in a 56 millisecond period.

10. The over-current verifier as claimed in claim 7 wherein said alternating current counter circuit second specific count is 3 counter advances representing three high to low transitions of said oversense signal.

11. The over-current verifier as claimed in claim 7 wherein, said timer circuit third specific count is 15 counter advances in a 56 millisecond period.

12. An over-current verifier used in a Subscriber Line Interface Circuit (SLIC) for validating an over-current condition on a subscriber loop, said SLIC connected to said subscriber loop via subscriber loop breaking means, and said SLIC including means for sensing the magnitude of electrical current flowing in said subscriber loop arranged to produce an oversense signal when a threshold limit is exceeded, and logic means for transmitting data representing the status of said SLIC to a central controller, said over-current verifier comprising:

first counter means connected to said SLIC disposed to receive said oversense signal, said first counter means arranged to begin counting when said oversense signal is received and produce an output signal responsive to said oversense signal continuing for a period that is greater than 56 milliseconds;

timer means connected to said SLIC disposed to receive said oversense signal, said timer means arranged to begin counting when said oversense signal is received;

second counter means connected to said SLIC disposed to receive said oversense signal, said second counter means arranged to advance by one count on the high to low transition of said oversense signal, said second counter means producing an output signal when three counter advances are produced before said timer means reaches a 56 millisecond period;

register means connected to said first counter means and to said second counter means for receiving said first counter means output signal, said register means arranged to transmit to said logic means an over-current signal signaling said central controller that an over-current condition exists on said subscriber loop and alternatively, said register means receiving said second counter means output signal, said register means further arranged to transmit to said logic means said over-current signal signaling said central controller that an over-current condition exists on said subscriber loop; and pulse generator means connected to said register means and to said loop breaking means arranged to receive said over-current signal from said register means and produce an output pulse that enables said subscriber loop breaking means, thereby, electrically breaking said subscriber loop and isolating said SLIC from said subscriber loop.

* * * * *